United States Patent
Ohta (10) Patent No.: US 7,293,117 B2
(45) Date of Patent: Nov. 6, 2007

(54) SELF-INSTALLING PERIPHERAL DEVICE WITH MEMORY WHEREIN IN RESPONSE TO USER REQUEST FOR ADDITIONAL STORAGE PERIPHERAL DEVICE BEING CONFIGURED TO REMOVE INSTALLATION SOFTWARE STORED ON MEMORY

(75) Inventor: Seiya Ohta, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 475 days.

(21) Appl. No.: 10/864,409

(22) Filed: Jun. 10, 2004

(65) Prior Publication Data

US 2005/0278461 A1    Dec. 15, 2005

(51) Int. Cl.
*G06F 3/00* (2006.01)
*G06F 13/00* (2006.01)
(52) U.S. Cl. .................. 710/10; 710/8; 710/9; 710/13; 710/14; 710/15; 713/1; 713/2; 713/191
(58) Field of Classification Search .............. 710/8–10, 710/13–15; 713/1, 2, 191
See application file for complete search history.

(56) References Cited

U.S. PATENT DOCUMENTS 7,133,938 B2 *  11/2006  Nagao ......................... 710/10
2005/0172051 A1 *  8/2005  Chang et al. ................. 710/36
2006/0007151 A1 *  1/2006  Ram ........................... 345/163

OTHER PUBLICATIONS

VPI (video Products Inc.); mini USB hub, 2 4 port USB hub, USB port expander, USB splitter; http://www.vpi.us/hubs-g.html; 2pp.
Dr. Dobb's Journal; USB Device Drivers; putting a low-cost, flexible serial bus to work; Apr. 2004; http://wwww.ddj.com ; 60-64pp.

* cited by examiner

*Primary Examiner*—Tammara Peyton
(74) *Attorney, Agent, or Firm*—Banner & Witcoff, Ltd (57) ABSTRACT

A self-installing peripheral device is provided. The device includes an onboard memory that stores a device driver that enables the device to communicate with a computer operating system. When the device is connected to a computer, the device automatically downloads the device driver to the computer and installs the device driver. In some embodiments, the device is a USB device that may include an internal USB hub. The onboard memory is connected to the USB hub and the primary functionality of the USB device also connects to the computer via a single USB connection through the USB hub. In other embodiments, the device connects to the computer via a wireless connection protocol. Such a device may be a Bluetooth-enabled device.

16 Claims, 9 Drawing Sheets

SELF-INSTALLING PERIPHERAL DEVICE WITH MEMORY WHEREIN IN RESPONSE TO USER REQUEST FOR ADDITIONAL STORAGE PERIPHERAL DEVICE BEING CONFIGURED TO REMOVE INSTALLATION SOFTWARE STORED ON MEMORY

BACKGROUND OF THE INVENTION

1. Field of the Invention

The present invention relates to computer devices. More specifically, the invention relates to a method and apparatus for installing a new hardware device in a computer.

2. Description of Related Art

Many computers are equipped with operating systems that provide what is known as "plug and play" functionality for many peripheral devices. The term "plug and play" refers to the ability of a computer operating system to detect the connection of a new peripheral device and automatically install the necessary drivers for the operating system to interact with that device. Apparently, the term was conceived out of the notion that one could plug in a device and immediately play with it. Plug and play technology was considered an advancement over then-existing methods for adding peripherals to a computer. Prior to the advent of plug and play technology, each new peripheral device required a manual installation of necessary device drivers in order to make the device function properly. Thus, device manufacturers were required to store installation programs and necessary drivers on a computer-readable media such as a floppy disk or CD-Rom that was included with the device.

Plug and play technology typically required cooperation between the peripheral manufacturer and the operating system developer. For a device to fully realize the advantages of plug and play technology, a device driver needed to be preinstalled on the computer to which the device was connected. If the required device driver were not preinstalled somewhere on the computer, some external computer-readable media was required to complete device installation even if the operating system recognized the device. Consequently, device manufacturers supplied operating system developers with drivers prior to the release of a new operating system so that the operating system would both recognize the peripheral device and install the necessary drivers upon detecting a connection.

Notably, even after the development of plug and play technology, device manufacturers continued to package their peripheral devices with disks and CD-Roms that stored installation software and device drivers. This packaging was necessary because of several shortcomings associated with the early plug and play model. First, because of the infrequency of new operating system versions or updates known commonly as service packs, those devices developed and released subsequent to the release of the plug and play operating system did not have drivers included with the latest operating system release. Second, device manufacturers frequently updated drivers to improve the performance of their products with the operating system. Thus, a driver included with an original release of an operating system may not have been the best available driver for that product. Although operating systems vendors dedicated significant resources to ensure that the latest drivers were included in service packs, new hardware peripherals were introduced frequently. As a result, it was not practical to have all drivers loaded into OS updates, as doing so required significant system resources and tended to waste computer memory storage space on unused drivers.

Figure 2:
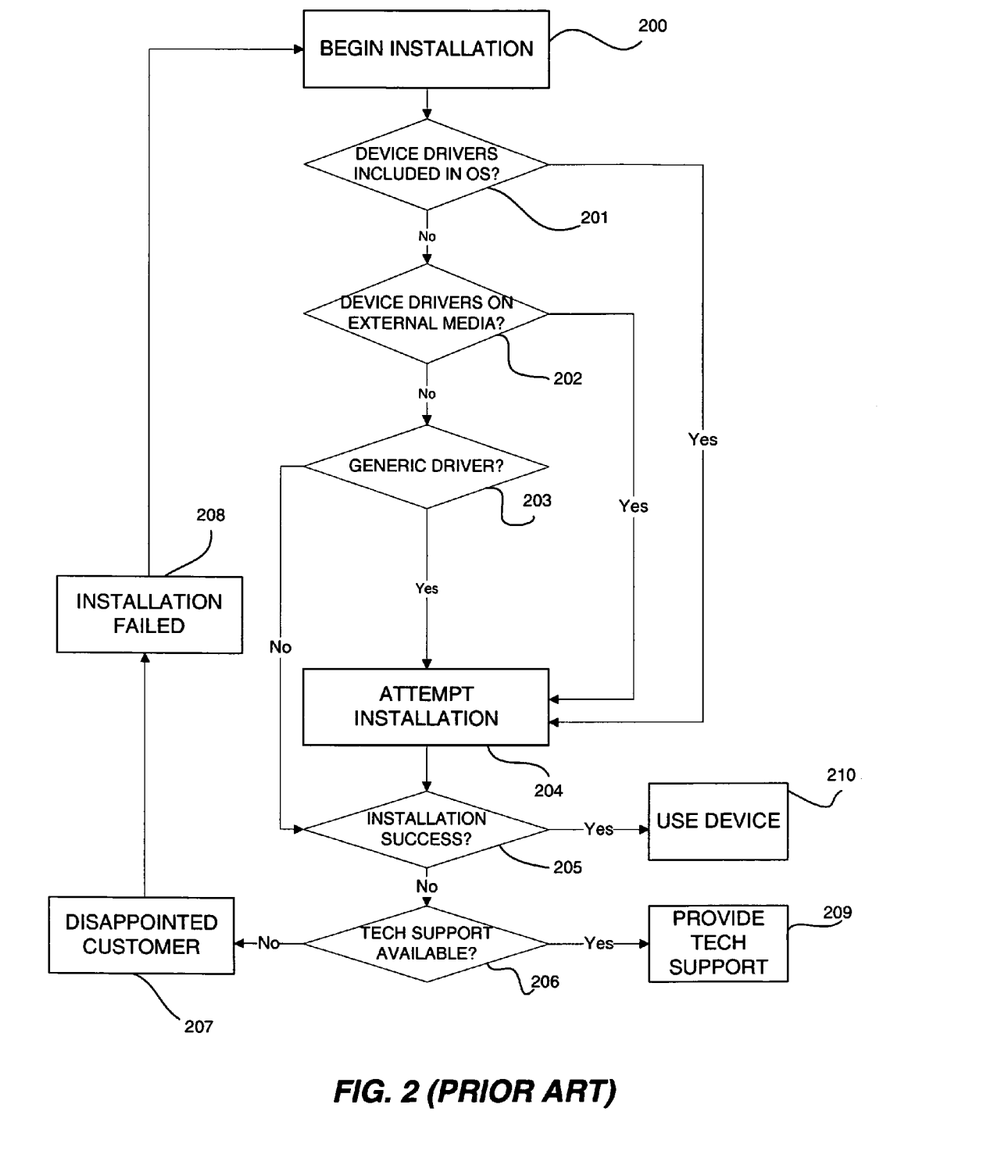
FIG. 2 provides a flowchart depicting a prior art installation routine.

FIG. 2 provides an example of the complexity inherent in an exemplary prior art peripheral installation process. At step 200, a plug and play device is connected to a computer and recognized by the operating system (OS). At step 201, the OS determines whether the device drivers for operating the device are stored on the hard drive in a location known by the operating system. If the device drivers are present, the system skips to step 204 where the operating system attempts to install the device from the known location on the hard drive using the device driver. If the device driver is not present in the OS, the system proceeds to step 202 where it looks for device drivers on external media such as a floppy disk or a CD-Rom. If drivers are found on external media, the system skips ahead to step 204 where it attempts to install the device using the device driver found on external media. If no device driver is located on external media, the system looks for a generic driver that may enable the peripheral device. If a generic driver is located, the operating system will attempt to install the device at step 204. At step 205, the system determines whether the installation was successful. If the installation was successful, the system proceeds to 210 and the user can then access the device. If the installation fails, the system proceeds to step 206 where it determines whether there is available technical support. If technical support is available, technical support is provided at step 209. Depending on the form of technical support provided, the support may involve considerable expense to the device manufacturer in the form of technical support personnel or web site maintenance. Alternatively, if technical support is not available, a disappointed customer results at step 207. Although intangible, a disappointed customer also represents substantial cost to the device manufacturer. At step 208, the installation fails and the customer must return to step 200 to restart the installation process. Plainly, an installation routine as provided in FIG. 2 has numerous potential failure points and is potentially expensive to the device manufacturer.

Eventually, both device manufacturers and operating systems developers realized that the Internet could be useful for providing and updating device drivers. As a result, updated device drivers were made available for downloading via a web site. However, this solution did not address the problem for those computers without access to the Internet. Moreover, one of the more common peripheral devices sold to computer owners was a network interface card (NIC). Ironically, in order to get the NIC driver necessary to access the Internet, an Internet connection was required.

In view of the shortcomings associated with the prior art, what is needed is a way for peripheral devices to be automatically installed without having to access some external media. It would be an additional advancement to provide a way for manufacturers of plug and play devices to easily ensure that the most recent device drivers are installed upon the initial connection of the device.

BRIEF SUMMARY OF THE INVENTION

According to a first aspect of the invention, a method for self-installing peripheral devices in an operating system is provided. The method comprises storing device drivers in a non-volatile memory located on the device. Upon connecting the device to the computer, the operating system recognizes the device and downloads and installs the device driver from the non-volatile memory on the device to provide true plug and play capability.

According to a second aspect of the invention, a USB hub is placed within a USB peripheral device. The hub provides a single access point for the computer to access both the functionality of the device and an installation routine stored in a non-volatile memory such as a flash memory chip linked to the USB hub.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
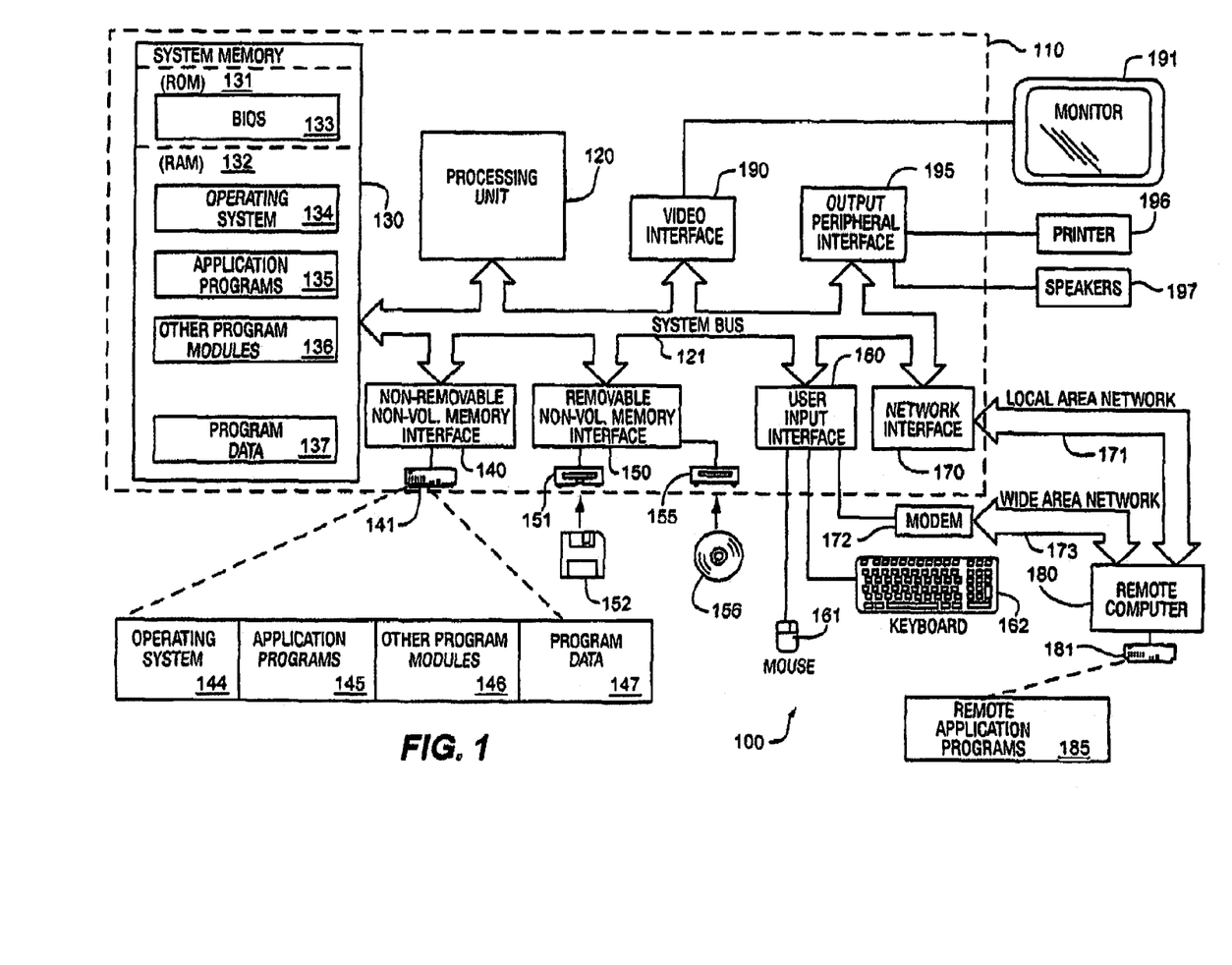
FIG. 1 illustrates an example of a computer environment suitable for practicing aspects of the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, video game consoles, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 3:
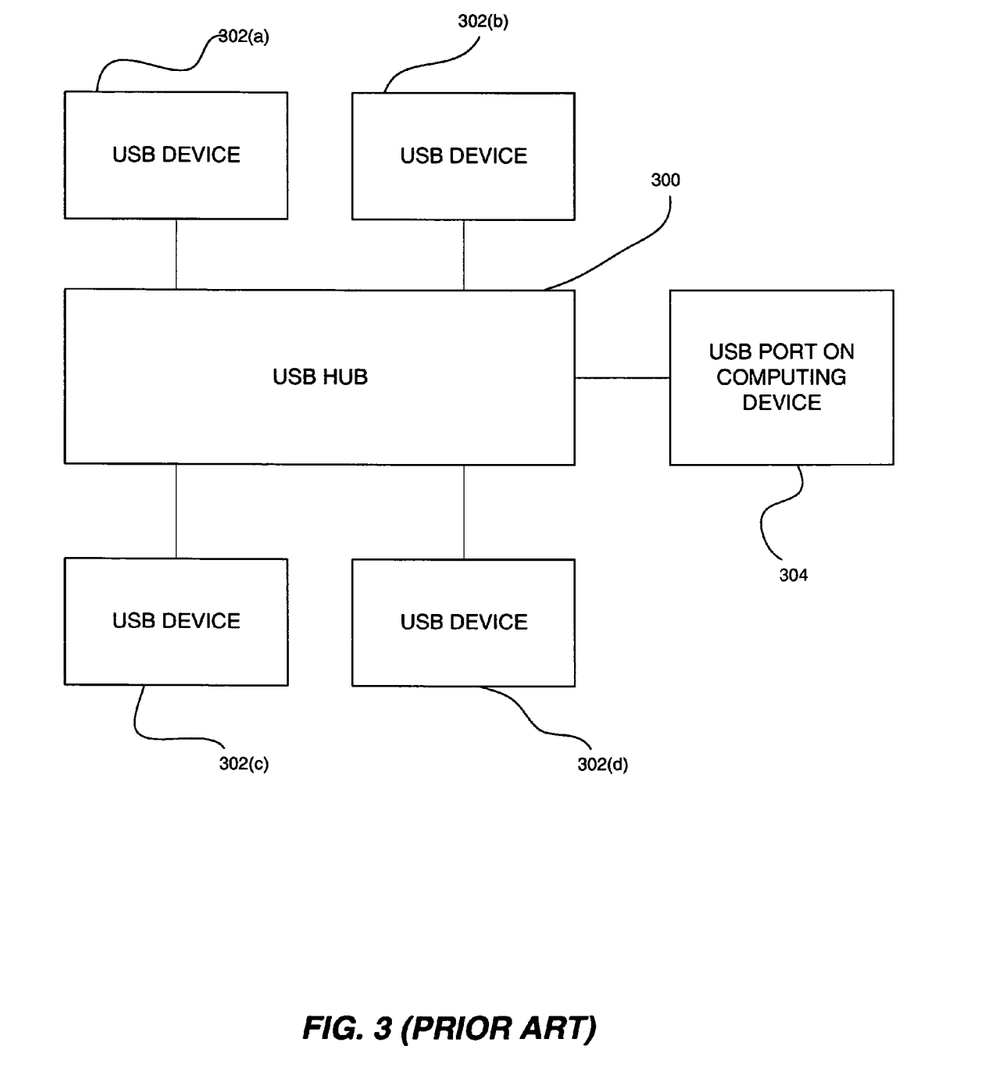
FIG. 3 illustrates a block diagram of a USB hub that may be used in practicing aspects of the invention.

The present invention overcomes limitations and deficiencies found in the prior art by providing a self-installing computer peripheral device. In an embodiment of the invention, a self-installing peripheral device may be a Universal Serial Bus (USB) device. USB device is herein defined as any peripheral device that can be communicate directly or indirectly with a computing device via a connection to a USB port on the computing device. FIG. 3 provides a block diagram of how a USB hub 300 may be used to connect one or more USB devices 302(*a*)-(*d*) to a single USB port 304 on a computing device, for example computer 110 in FIG. 1. USB hub is herein defined as an apparatus that allows two or more USB devices to share a single USB connection. USB hubs are known in the art and sold to consumers for the purpose of connecting multiple USB devices to a computer with limited available USB ports. These known USB hubs usually take the form of small external devices that connect to a USB port on a computing device.

USB hub 300 provides an interface by which several USB devices 302(*a*)-(*d*) can share a single USB connection to operably connect to a USB port on a computer. Frequently, USB hub 300 is an external device that is used to allow several USB devices to connect to a personal computer 110 that may only have a single USB port. For example, referring again to FIG. 3, USB device 302(*a*) might be a printer, USB device 302(*b*) might be a network interface card (NIC), 302(*c*) might be a keyboard, and 302(*d*) might be a mouse. The USB hub allows each of these devices to share a single connection to computer 110.

Figure 4:
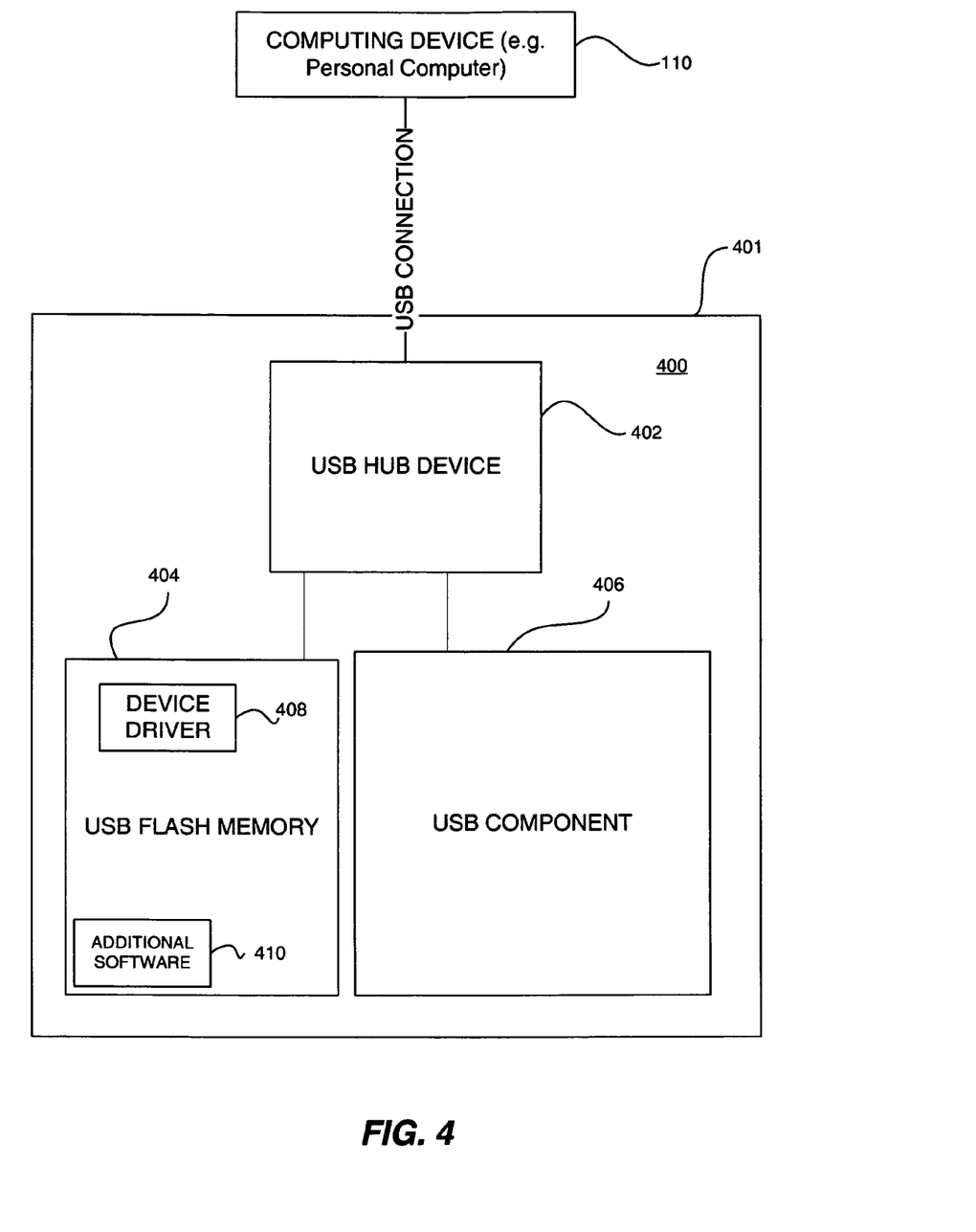
FIG. 4 illustrates a block diagram representing a USB device suitable for practicing aspects of the present invention.

Referring to FIG. 4, a self-installing peripheral device 400 is shown according to one or more aspects of the invention. Unlike the scenario presented in FIG. 3 wherein a USB hub 300 is an external device, FIG. 4 presents a self-installing peripheral device 400 that includes an internal USB flash memory 404 and a USB component 406, each operably connected to computing device 110 via an internal USB hub device 402 and a USB-enabled connection. The USB flash memory 404 may have stored on it installation software. The term "installation software" is herein defined as any software that interacts with self-installing peripheral device 400 to improve the functionality of the self-installing peripheral device. In one embodiment, installation software may include a software device driver that, when installed into operating system 144, enables USB component 406 to operably function with operating system 144, application programs 145, other program modules 146, and program data 147 stored on computer 110. In other embodiments, installation software may be an application program that is used in conjunction with self-installing peripheral device 400.

Self-installing peripheral device 400 may be embodied in any of several different hardware devices. By way of example and not of limitation, in one embodiment self-installing peripheral device 400 may be a computer mouse or some other cursor control device. In this embodiment, each of USB hub device 402, USB flash memory device 404 and USB component 406 will be housed inside the outer housing 401 of the mouse, such that the mouse appears no different in appearance from a typical USB mouse. Other types of components that may be modified in this way to be self-installing peripheral devices may include (but not necessarily be limited to) printers, network interface cards (NICs), keyboards, joysticks, trackballs, digital pens, MP3 playing devices, digital cameras, or any other peripheral device that may be connected to a computer. Although the above example is described in terms of universal serial bus components and hubs, it would be easily understood by one of skill in the art that the inventive features described herein may be implemented using other known device connecting protocols such as PCI, SCSI, EISA, ISA, Firewire (IEEE 1394), etc. Moreover, one of skill in the art would further understand that the inventive features described herein may be implemented using Bluetooth and other wireless connection protocols known in the art.

Referring again to FIG. 4, stored in flash memory 404 is device driver 408 which allows the operating system to interact properly with the device. Additional software 410 may also be stored in flash memory 404. Additional software 410 may be software that allows configuration of some advanced feature of the device. Or, in another embodiment, it may be software that may be used in conjunction with the device. For example, if self-installing peripheral device 400 is a digital camera, additional software 410 may be a multimedia program such as Microsoft® Photo Editor. If self-installing peripheral device 400 is an MP3 player, additional software 410 may be some music playing software or music library software that allows MP3 songs to be organized in various ways.

Figure 5:
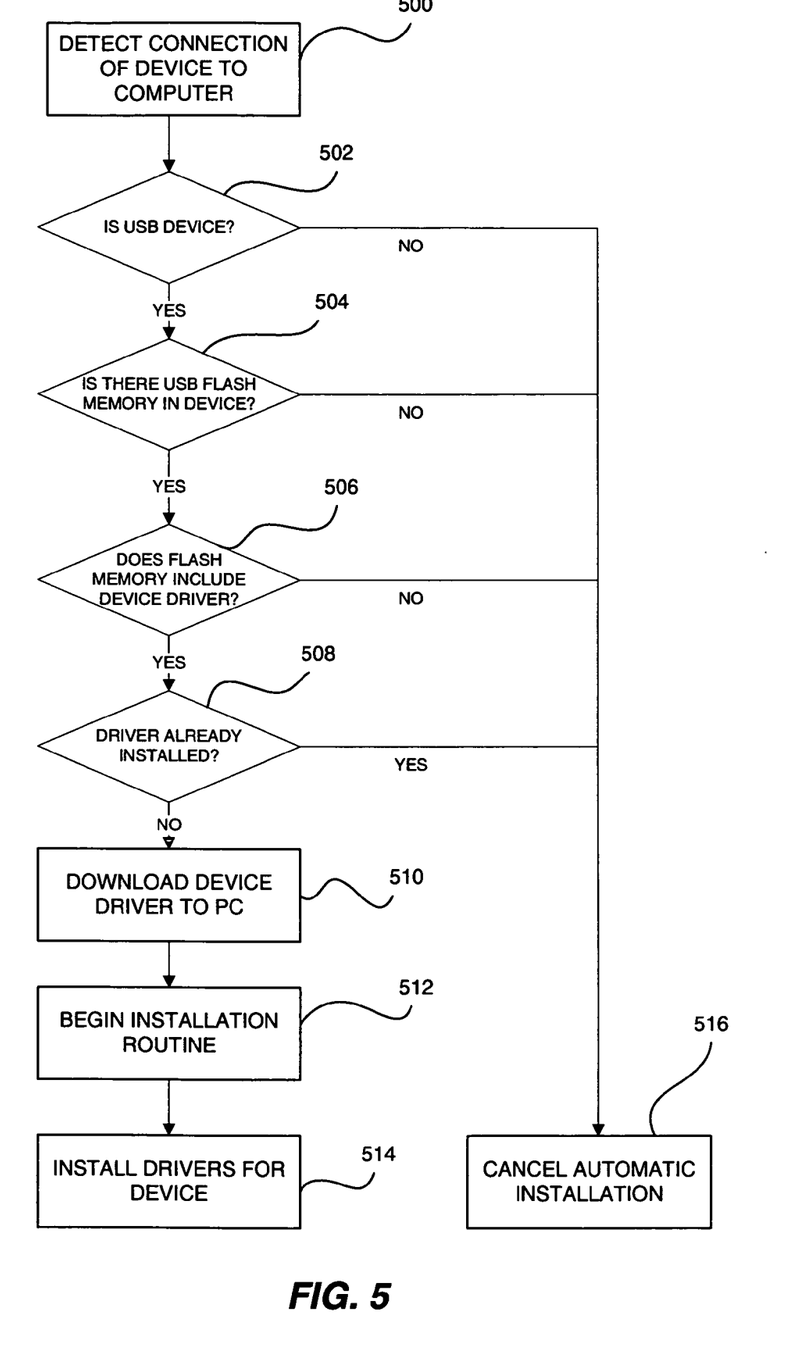
FIG. 5 provides a flowchart depicting an installation routine according to aspects of the invention.

According to one or more aspects of the invention, a self-installing peripheral device will automatically install the device driver that configures the computer to correctly interface with the peripheral device. FIG. 5 provides a flowchart that describes steps for automatically installing a self-installing peripheral device according to one or more aspects of the invention. In the example provided, the self-installing peripheral is a plug-and-play enabled USB device such as the one described in FIG. 4. However, it should be appreciated by one of skill in the art that the device may use some other type of connection (including wireless connections) as described above. At step 500, self-installing peripheral device 400 is connected to a computer (e.g. computer 110) and the connection is detected. According to methods well-known in the art, the plug-and-play device identifies itself to the system and tells the system which resources that it requires. At step 502, the system generally determines whether the device is capable of being a self-installing peripheral device, in this specific embodiment by asking whether it is a USB device. If the detected peripheral device is not capable of self-installation, the automatic installation is canceled at step 516.

If the device is capable of self-installation, the system proceeds to step 504 where it determines whether there an accessible storage area available on the device. In an embodiment where the device is a USB device, the system may look for a USB flash memory chip 404 on the device. In other embodiments where the device is some other kind of peripheral device, the system may look for a flash memory chip that is not USB enabled. If USB flash memory chip 404 is not present, the automatic installation is canceled at step 516. If a USB flash memory chip 404 is present, the system proceeds to step 506 where it determines whether the accessible storage area includes a device driver for self-installing peripheral device 400. If no device driver is found in the storage area (e.g. USB flash memory chip 404), the automatic installation is canceled by proceeding to step 516. If a suitable device driver is found, the system then determines whether the device driver has already been installed on the computing device. If so, there is no need to reinstall it, and the automatic installation is cancelled at 516. If the device driver has not yet been installed, the device driver stored in memory 404 on self-installing peripheral device 400 is downloaded to the PC at step 510 by copying it from flash memory 404 to the appropriate storage media on computing device 110.

Next, the operating system detects the new driver and begins the installation process at step 512. This process may be initiated by the operating system itself using autoplay or some other automatic software launching technology, or through some signal received by the operating system from the device. In an alternative embodiment, the installation could be user-initiated via a user response to a query that asks whether the user wishes to automatically install the device. Finally, at step 514, the device drivers are installed for the device, resulting in the ability for the computer to communicate with the peripheral device.

According to other aspects of the invention, self-installing peripheral device 400 may also be used to store user-configured settings for the device by uploading them and storing them in flash memory chip 404 and automatically transferring these settings to a second computer so that the user can easily transfer the device from one computer to another. Although this feature is particularly useful in the context of portable peripheral devices, it may also be implemented in the context of fixed peripheral devices as well—for example, in a situation where a user replaces a personal computer but does not replace the peripheral devices that are attached to it.

As discussed above, in some embodiments of the invention, self-installing peripheral device 400 may not only store a device driver 408 in flash memory 404, but also may store additional installation software 410. In some instances, additional software 410 is provided to allow a user to take advantage of additional features of device 400. For example, in a USB mouse, a basic mouse driver will connect the mouse so that the basic functionality of the mouse is available to the user. The mouse may have additional features built into the hardware that are not accessible through the device driver alone. For example, configuration characteristics such as the speed at which the mouse cursor moves across the screen, scroll wheel rates, thematic cursor configurations, or even the right-handed or left-handed configuration of the buttons may not be accessible via the device driver (which provides only basic functionality) but rather through software that must be installed in addition to the device driver.

Figure 6:
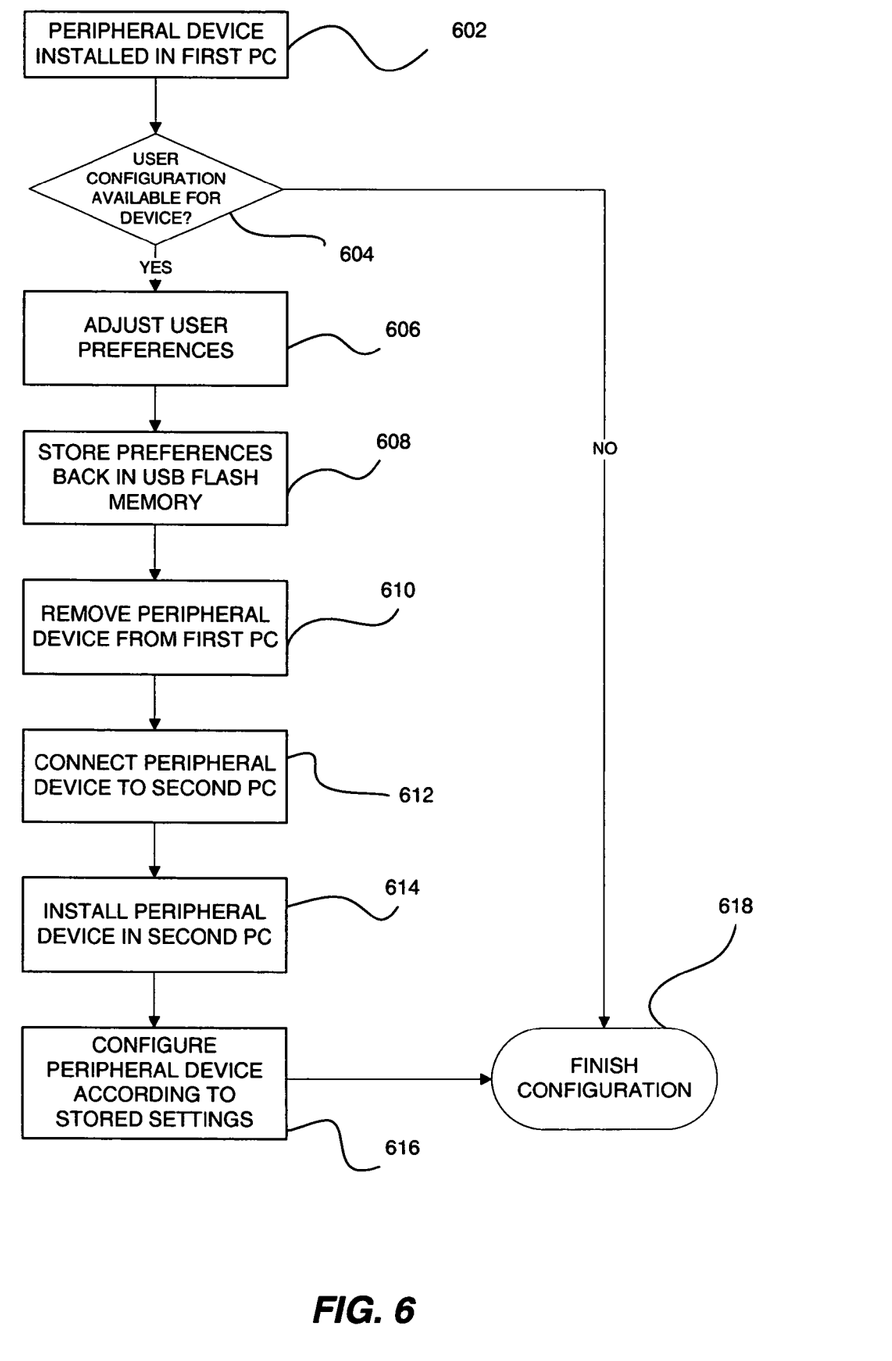
FIG. 6 provides a flowchart describing steps for moving a self-installing peripheral device from one computer to a second computer according to aspects of the invention.

Referring to FIG. 6, a flowchart describes the steps that may be used to configure a second computer according to configuration settings stored in a self-installing peripheral device such as the USB self-installing peripheral device 400 of FIG. 4. Although the method is described in view of the USB device of FIG. 4, a USB device is only one of many possible types of devices that may be used to practice the steps of the method set forth in FIG. 6. For example, in an alternative embodiment, a computing system may include a computer that utilizes a wireless connection protocol in conjunction with a wireless connection enabled device. In one embodiment, the system may include a Bluetooth-enabled personal computer and a Bluetooth device such as a keyboard, mouse, printer, or some other Bluetooth-enabled peripheral known in the art. Just as the operating system detects a USB device connection in the USB context, the operating system may detect a Bluetooth connection and download a stored driver stored in a non-volatile memory on the Bluetooth-enabled device in a similar fashion as described above.

At step 602, peripheral device 400 is set up on a first computer by installing device driver 408. This installation may be accomplished using the steps from FIG. 5. Once the device has been successfully installed, the system determines at step 604 whether additional configuration is available for the device via additional software 410. If there is no available additional software 410, the configuration of the first computer ends by proceeding to step 618. If additional configuration software is found, the user adjusts the user preferences for the device at step 606. At step 608, the preferences are written back to flash memory 404 for later use. Next, self-installing peripheral device 400 is removed from the first computer at step 610, and then connected to a second computer at step 612. Upon being connected to the second computer, at step 614, the self-installing peripheral device 400 automatically installs its device driver on the second computer. This may be carried out according to the steps provided in FIG. 5. Next, at step 616, the system reads the stored settings from flash memory 404 and configures the second computer using additional software 410 in conjunction with the stored settings. As a result, the second computer will interact with self-installing peripheral in the same manner was the first computer.

Figure 7:
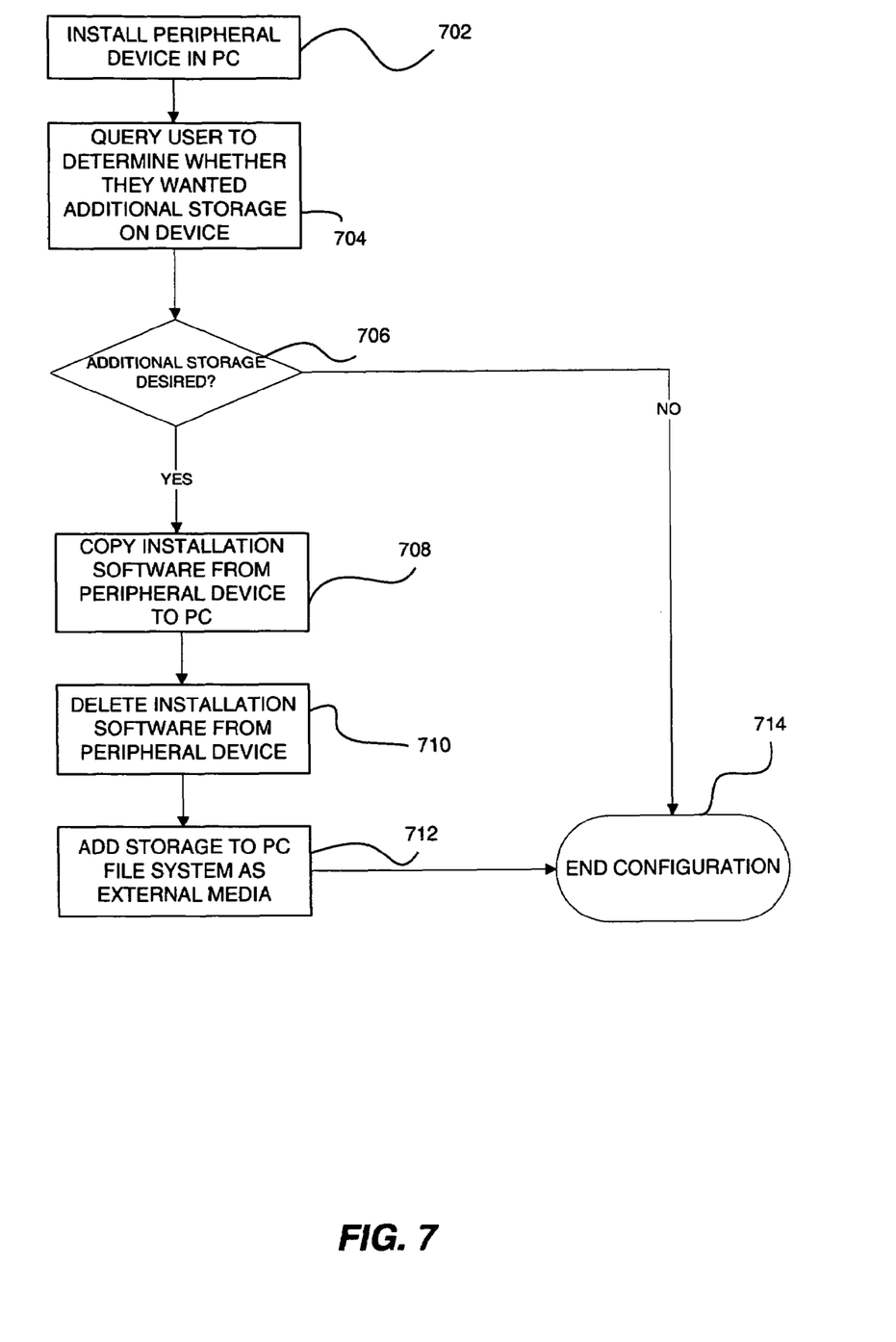
FIG. 7 provides a flowchart that describes steps for creating additional storage space in the self-installing device according to aspects of the invention.

According to additional aspects of the invention, subsequent to device installation, the data storage capability provided by flash memory 404 may be offered to the user as additional storage capacity. Referring to FIG. 7, at step 702, self-installing peripheral device 400 has been installed and configured in computer 110 possibly through the steps described in FIG. 5. Upon completion of the installation and configuration, the system queries the user to determine whether they wish to receive additional storage on the device at step 704. The computer instructions for executing this query may be stored in additional software 410, or they may be stored in storage media on computing device 110. The phrasing of this user query may be characterized depending upon the type of self-installing peripheral. For example, where peripheral device 400 is a digital music player (e.g. MP3 player), the system could ask the user whether they would like extra storage provided on the device. Providing this extra storage may allow the MP3 player to increase the number of songs that can be stored on the device. In the case of a computer mouse, the system could ask whether the use wishes to expand the available storage in the mouse. If the user chooses to expand the available storage, the mouse may be used as a data storage device. Using the mouse as a data storage device would allow the user to hook up the mouse to any computer and access and load the presentation from the mouse.

If the user declines the additional free storage space on the device, the installation process is terminated at step 714. If the user response indicates that the user wishes to receive additional storage space, the system proceeds to step 708 where it may copy the device driver 408 and/or additional software 410 to the local hard disk drive 141 on computer 110. This copy routine may allow the user to select the copy location of the files on hard disk 141, or alternatively it may copy to a pre-designated area on hard disk 141 or some other storage media attached to computer 110. Operating system registry settings may be updated to reflect the new location of the device driver and the additional software. In another embodiment, the user or system may skip step 708, and move directly to step 710.

At step 710, the system deletes all of the data (device driver 408, additional software 410) from flash memory 404. Because device drivers tend to be relatively small and because of their role in enabling the device to function properly with the operating system, device driver 408 may optionally be left in flash memory 404 with only additional software 410 being removed. At step 712, flash memory 404 may be mounted into the computer file system as an external media device. Flash memory 404 may then be made available via a program such as Windows Explorer as an additional drive mapping. Upon adding the additional storage provided by flash memory 404 to the file system, the configuration process terminates at step 714.

Figure 8:
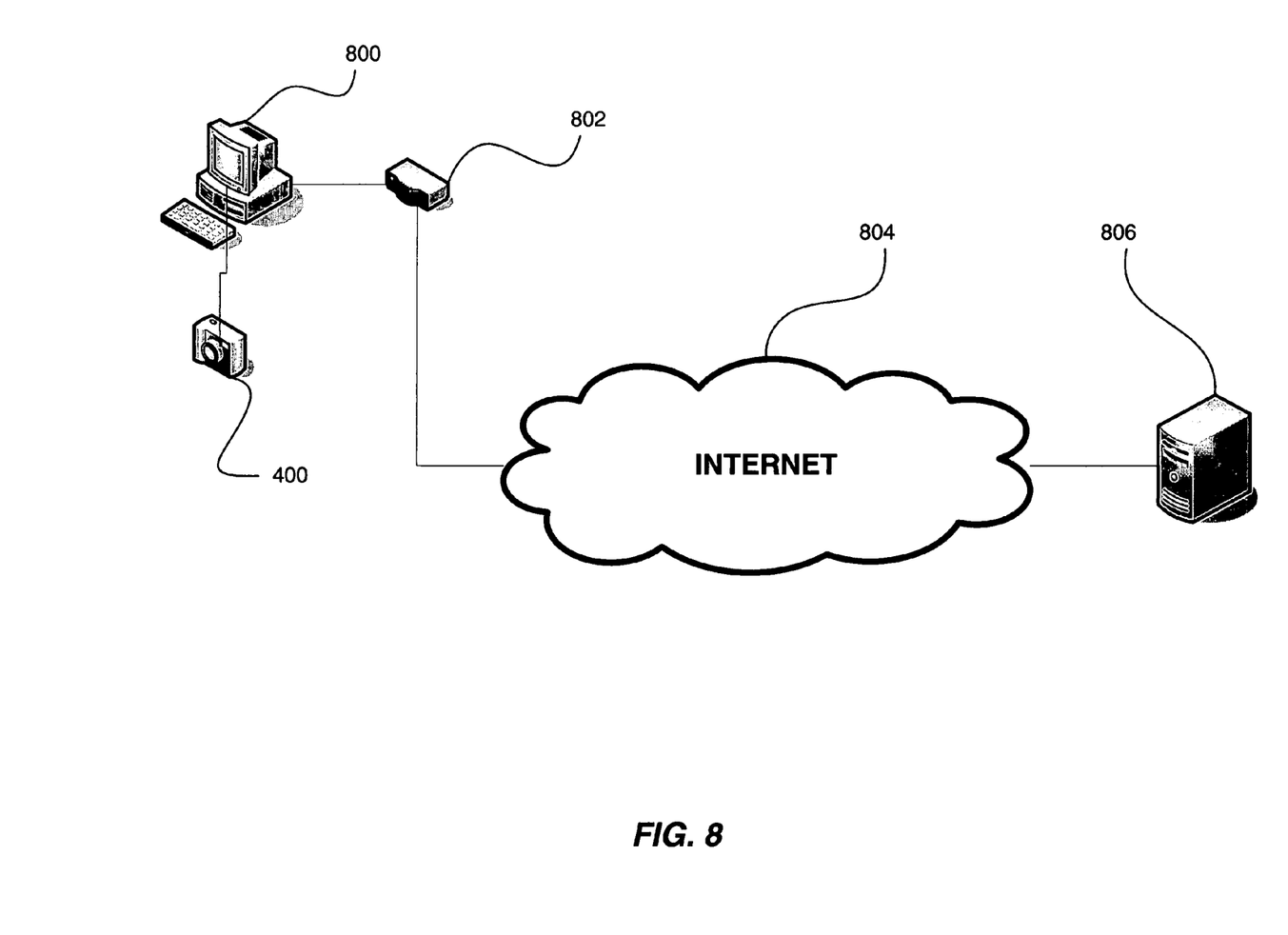
FIG. 8 illustrates a block diagram representing a network-enabled environment suitable for practicing an embodiment of the invention.

According to another aspect of the invention, a method for maintaining an updated version of a driver for a self-installing peripheral device is provided. FIG. 8 illustrates a network environment suitable for practicing these aspects of the invention. Computer 800 is connected in a local area network to router 802. Router 802 provides a gateway to a wide area network such as Internet 804. Remote server 806 is also connected to Internet 804 and is accessible to local computer 800. Stored on remote server 806 is the most recently updated device driver for peripheral device 400 and any additional software that may be used in connection with the device. Connected to computer 800 is self-installing peripheral device 400, in this case shown as a digital camera.

Figure 9:
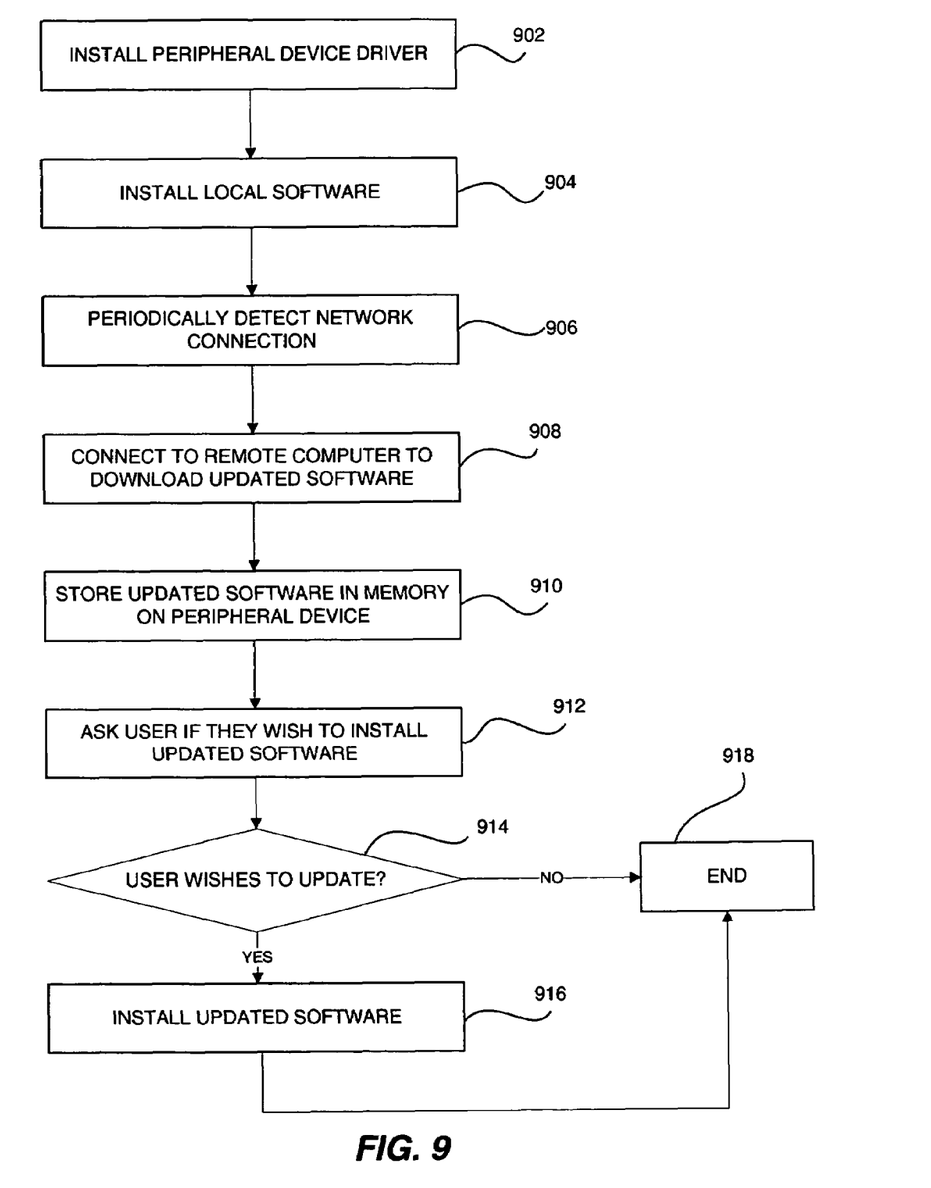
FIG. 9 provides a flowchart depicting the updating of a self-installing driver via a computer network according aspects of the invention.

Referring now to FIG. 9, a flowchart describes the steps used for maintaining updated software on a peripheral device. A step 902, a device driver 408 is installed in computer 800 which enables the operating system to interact with device 400. This installation may be according to the method described in FIG. 5, or alternatively it may be according to some other installation routine that is known in the art. Next, at step 904, any additional software that is available for with self-installing peripheral device 200 is installed. Like before, this installation may be according to a routine previously discussed herein (e.g. FIGS. 5 and 6), or alternatively, it may be according to some other installation routine known in the art.

Once peripheral device has been setup on computer 800, a network connection to wide area network 804 is detected. This detection may be accomplished through techniques that are well-known in the art such as pinging a known IP address. Once a network connection is detected, at step 908, the system connects to remote server 806 and downloads the updated driver and any additional software. Rather than storing the software on the hard drive of the computer, at step 910 the downloaded data is stored instead in flash memory 404 on self-installing peripheral device 400 by writing the new driver to the flash memory and optionally deleting the old driver. Storing the software in flash memory on the device ensures that anytime the device is installed into a second computer, the most up-to-date version of the device driver is provided with the installation. At step 912, the system queries the user, asking whether they wish to update their device driver for the device. If the user declines, the process terminates at step 918. If the user accepts, at step 916, the updated software is installed for device 400.

The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A self-installing peripheral device configured to be connected to a computing device comprising:
    a housing;
    a memory located inside the housing configured to store installation software in the memory; and
    a hub device located in the housing and connected to the memory, wherein in response to a user request for additional storage after the peripheral device has been installed in the computing device, the peripheral device being configured to remove the installation software stored in the memory to provide the additional storage on the peripheral device.

2. The self-installing peripheral device of claim 1, further comprising:

a USB component located in the housing and connected to the hub device, wherein the memory has stored thereon a device driver for the USB component.

3. The self-installing peripheral device of claim 2, wherein the self-installing peripheral device is a USB device.

4. The self-installing peripheral device of claim 3, wherein the hub is a USB hub.

5. The self-installing peripheral device of claim 4, wherein the USB component is a cursor control device.

6. The self-installing peripheral device of claim 5, wherein upon detecting a connection of the self-installing peripheral device to a computing device, the device driver is installed on the computing device.

7. The self-installing peripheral device of claim 5, wherein the memory is a USB flash memory.

8. The self-installing peripheral device of claim 7, further comprising:

an additional USB flash memory for storing an additional software thereon.

9. The self-installing peripheral device of claim 8, wherein the additional USB flash memory is connected to the USB hub.

10. The self-installing peripheral device of claim 9, wherein the device is a mouse having a sensor for determining displacement of the mouse relative to a supporting surface.

11. The self-installing peripheral device of claim 9, wherein the device is a trackball containing a rotatable ball disposed on an upper surface of the device a sensor for determining the rotation of the ball relative to the upper surface.

12. The self-installing peripheral device of claim 9, wherein the device is one of a printer, a digital camera having a memory and a lens for capturing images, and a MP3 player having a memory and software for playing MP3 files.

13. The self-installing peripheral device of claim 1, wherein the connection is a wireless connection.

14. The self-installing peripheral device of claim 13, wherein the device is a Bluetooth-enabled device.

15. The self-installing peripheral device of claim 1, wherein responsive to the user request and prior to removing the installation software stored in the memory, copying the installation software from the peripheral device to the computing device.

16. The self-installing peripheral device of claim 1, wherein after removing the installation software from the memory, providing the additional storage as part of a file system of the computing system.

* * * * *